United States Patent Office 3,516,306
Patented June 23, 1970

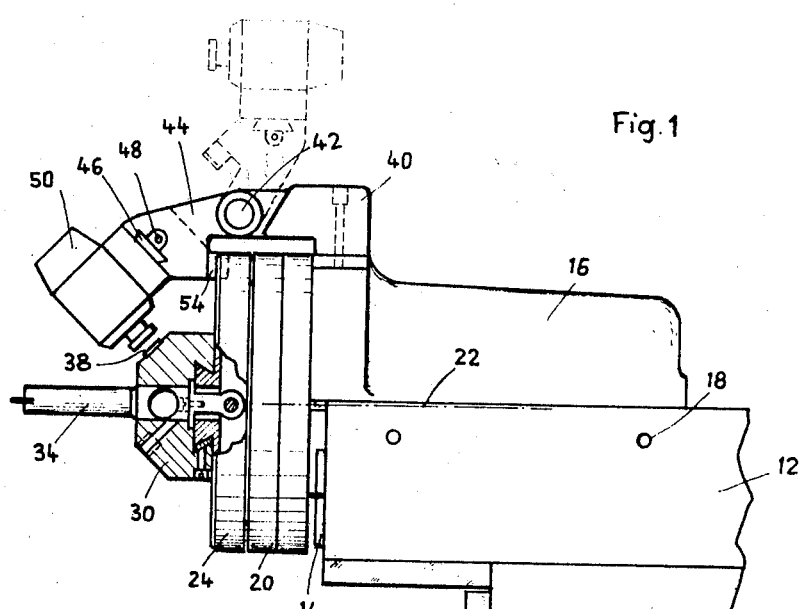
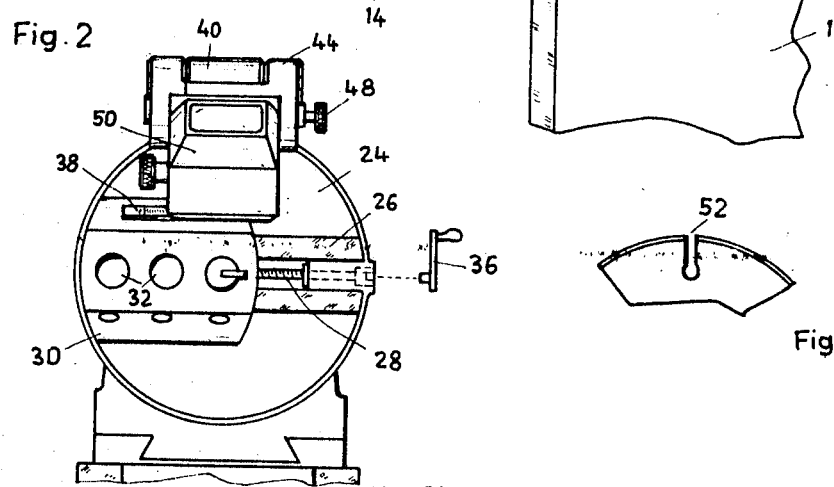
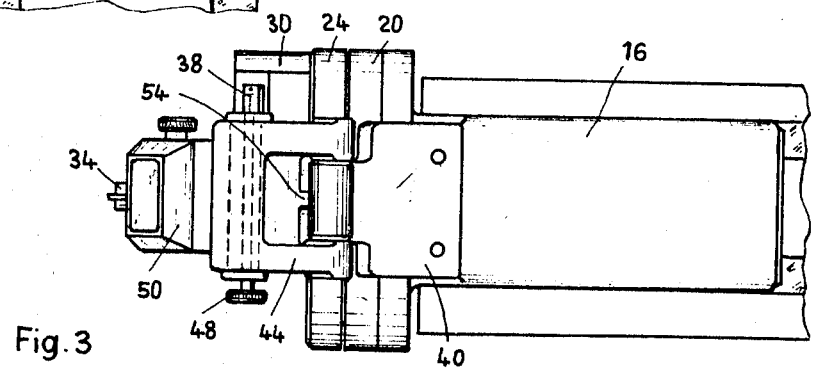

3,516,306
BORING HEAD FOR MACHINE TOOLS
Johann Müller, Unterhaching, Germany, assignor to Friedrich Deckel Prazisions Mechanik und Maschinenbau, Munich, Germany, a German firm
Filed Aug. 12, 1968, Ser. No. 751,847
Claims priority, application Austria, Aug. 31, 1967,
A 8,008/67
Int. Cl. B23b 49/00
U.S. Cl. 77—1                    9 Claims

ABSTRACT OF THE DISCLOSURE

A boring head for application to a machine tool such as a milling machine, has a rotatable flange on which a tool holder is displaceable in a diametrical direction perpendicular to the axis of rotation of the flange. To enable precise reading of the extent to which the tool holder is displaced radially from a given position, the displaceable tool holder is provided with a scale parallel to the direction of displacement, read by means of a magnifying glass also displaceable for adjustment in the same direction, the magnifying glass being mounted on a bracket arm swingable on a pivot on a stationary part of the housing containing the bearings for the rotatable flange. The pivot on which the magnifying lens swings is at right angle to the axis of rotation of the flange, and the parts are so arranged that when the magnifying lens is not in use for reading the displacement scale, it may be swung up to a position out of the way of the coolant and the chips.

Background of the invention

In the machine tool art, it is known to have a boring head which includes a rotatable flange on which a tool holder is mounted for displacement in a direction radially, or diametrically with respect to the axis of rotation of the flange, so that the tool may perform facing or boring operations concentrically around the axis of rotation of the flange, at a distance therefrom which is variable by varying the extent of radial displacement of the tool holder. It is also known to provide the displaceable tool holder with a scale for reading the extent of displacement, the index of the scale being developed at times as a vernier. An example of this is the construction disclosed in Swiss Pat. 232,960, granted in 1944. The accuracy obtainable by such a construction is, however, frequently not sufficient.

An object of the invention is the provision of a generally improved and more satisfactory displaceable boring head, of the general kind or type above mentioned.

Another object is the provision of a boring head so designed that the accuracy or precision of reading the displacement of the tool holder from a given position is substantially improved.

Still another object is the provision of a boring head with a displaceable tool holder having a scale for reading the degree of displacement, the index or reference mark of the scale being on a magnifying lens or reading glass which is swingably fastened to the stationary housing and arranged to be swung up out of the way of coolant and chips when not in use.

A further object is the provision, in such a boring head, of means for displacing the magnifying lens or reading glass in a direction parallel to the direction of displacement of the tool holder.

A still further object is the provision of interlocking parts to insure that when the magnifying lens is used for reading the scale, the rotatable flange of the boring head will be held in a position wherein the direction of displacement of the tool holder is parallel to the direction of displacement of the magnifying lens, and the optical axis of the lens is perpendicular to the scale.

Brief description of the drawings

The foregoing and other desirable objects and advantages may be attained in the manner disclosed as an illustrative embodiment of the invention in the following description and in the accompanying drawings which are incorporated herein by reference and which form a material part of the disclosure, in which:

FIG. 1 is a fragmentary side elevation of the upper part of a milling machine, with a preferred embodiment of the boring head of the present invention applied thereto, part of the boring head being shown in vertical section;

FIG. 2 is a front elevation thereof;

FIG. 3 is a top plan view thereof; and

FIG. 4 is a front elevation of a fragment of the rotatable flange of the boring head, with other parts removed.

Description of the preferred embodiment

Referring now to the drawings, there is a conventional column or gear box 10 of a milling machine, carrying a horizontally displaceable spindle stock 12 in which there is supported a horizontal milling spindle 14. Horizontally movable on guideways on the top of the spindle stock 12 is a boring head 16 which can be clamped in any desired adjusted position by the clamping screws 18. At its front end, the boring head 16 carries a fixed flange 20, in which there is supported a rotatable flange 24, rotatable about the horizontal axis indicated schematically at 22. The parts for rotating the flange 24 on the axis 22 are conventional parts well known in the art, and therefore not illustrated.

On the front surface of the rotatable flange 24 is a dovetail guide 26 arranged diametrically and perpendicular to the axis of rotation 22. On this dovetail guide 26 is a displaceable tool holder or carriage 30, displaceable in a radial direction by means of a threaded spindle 28 which may be turned when required by attaching a detachable crank handle 36. The carriage or tool holder 30 has suitable means of known form, such as the bores or sockets 32, for holding any suitable tool such as the boring cutter 34. The tool holder 30 is also provided with a scale 38 to indicate the extent of radial displacement of the holder 30. This scale may be graduated directly in units of measurement, indicating the extent of radial displacement, but it is preferred to have the scale reduced in the ratio of 1:2, so that the scale will indicate changes in diameter rather than changes in radius of the work being bored or faced or otherwise performed by the tool 34, as a result of any given radial displacement of the tool holder 30.

A bracket or holder 40 is stationarily mounted, by screws or otherwise, on the housing 16 of the boring head, which housing 16, although adjustable with respect to the spindle stock 12, may be regarded as a stationary member during any particular phase of operation of the boring head. On a pivot pin 42 mounted on this bracket 40, there is swingably mounted a holding arm 44 which supports a dovetail guide 46 along which may be moved, by rotating the feed spindle 48, a magnifying lens or reading glass 50 of a construction which is known per se. The pivot pin 42 is at a right angle to the rotary axis 22 of the boring head, and the dovetail guideway 46 is parallel to the pivot pin 42 and therefore also at a right angle to the rotary axis 22. Thus when the rotary flange 24 is turned to a position wherein the direction of the dovetailed guide 26 is parallel to the direction of the pivot pin 42, it will also be parallel to the dovetail guide 46 along which the magnifying lens or reading glass 50 is movable.

To insure that the parts are in this parallel relationship just mentioned at the time that the magnifying lens is being used for reading the scale 38, the rotary flange 24 is provided with a single notch or slit 52 (FIG. 4), and the supporting arm 44 of the magnifying lens is provided with a projection 54 which will fit snugly into the notch 52 when the rotary flange 24 is turned to the proper position to make the guideway 26 parallel to the axis of the pin 42 and the direction of the guideway 46. When this projection 54 fits into the notch 52, the magnifying lens can swing all the way down to its effective position of use for reading the scale 38, this being the position shown in full lines in the drawing. In this position, the optical axis of the magnifying lens is perpendicular to the scale 38. If the notch 52 is not in proper alinement with the part 54, the arm 44 cannot swing down far enough to bring the magnifying lens to a position of use, and this will be immediately noticed by the operator attempting to use the device. When the magnifying arrangement is not being used for reading the scale 38, it is swung upwardly to the position shown in broken lines in FIG. 1, and remains stationary in this position, out of the way of the chips and the coolant, while the flange 24 and tool holder 30 and tool 34 are being rotated during the performance of work.

When the magnifying arrangement is swung down from the broken line position to the full line position in FIG. 1, it may be adjusted along its guideway 46 by turning the spindle 48, so as to bring the index mark or reference point on the magnifying lens opposite any desired graduation of the scale 38, and the tool holder 30 may be adjusted as required, by applying the detachable crank 36 to the end of the spindle 28 and turning the spindle 28 to the required extent. Thus a very accurate reading of displacement is possible, for high precision machining. While useful in any event, the magnifying lens arrangement is particularly useful when the scale 38 is graduated to read in terms of diameter rather than in terms of radius, since in that case the graduations are finer or closer together and the magnifying reader is more necessary.

Although the construction is capable of being used in various ways, in accordance with the wishes of the particular mechanic using it, it is usually most convenient to set the reference mark or index mark on the magnifying lens 50 opposite the division mark of the scale 38 which indicates or corresponds to the diameter of the circle of travel of the cutting tool. The lens then indicates the actual size of the bore hole being worked with the boring cutter, so that the infeed required for this desired size can be set directly without calculation.

It is to be understood that the disclosure is given by way of illustrative example only, rather than by way of limitation, and that without departing from the invention, the details may be varied within the scope of the appended claims.

What is claimed is:

1. A boring head comprising a non-rotating housing, a rotatable member rotatable with respect to said housing about an axis of rotation, a tool holder mounted on said rotatable member for displacement thereon in a radial direction with respect to said axis of rotation, a graduated scale mounted on said tool holder and extending in a direction parallel to said direction of displacement of said tool holder, and a magnifying lens mounted on said housing for swinging movement relative thereto from an effective position for reading said scale to an ineffective position substantially removed from said scale.

2. A construction as defined in claim 1, in which said magnifying lens serves as an index for reading said scale.

3. A construction as defined in claim 1, in which said magnifying lens swings on a swing axis offset from and lying in a plane perpendicular to said axis of rotation of said rotatable member.

4. A construction as defined in claim 3, in which said magnifying lens is displaceable in a direction parallel to said swing axis.

5. A construction as defined in claim 4, further including cooperating interengaging parts on the mount of said magnifying lens and on said rotatable member for coordinating said rotatable member and said lens in a position relative to each other in which said direction of displacement of said tool holder is parallel to said swing axis.

6. A construction as defined in claim 1, further comprising mating means associated with said magnifying lens and said rotatable member for determining a position relative to each other in which said scale on said tool holder is perpendicular to the optical axis of said lens.

7. A construction as defined in claim 6, further comprising a mounting arm mounted on said housing for swinging relative thereto about a swing axis lying in a plane perpendicular to said axis of rotation of said rotatable member, said magnifying lens being mounted on said mounting arm with the optical axis of said lens in a plane perpendicular to said swing axis and parallel to said axis of rotation of said rotatable member.

8. A construction as defined in claim 7, wherein said mating means comprises a notch in said rotatable member and a projection on said swinging arm for entering said notch when said rotatable member is in said position relative to said magnifying lens and said lens is in cooperative reading relation to said scale.

9. A construction as defined in claim 1, further comprising a mounting arm mounted on said housing for swinging relative thereto about a swing axis lying in a plane perpendicular to said axis of rotation of said rotatable member, and guideway means on said arm extending in a direction parallel to said swing axis, said magnifying lens being mounted on said arm for movement along said guideway means in said direction parallel to said swing axis.

References Cited

UNITED STATES PATENTS

| | | | |
|---|---|---|---|
| 1,149,383 | 8/1915 | Meilicke | 350—116 |
| 1,836,662 | 12/1931 | Head | 33—179.5 |
| 1,952,073 | 3/1934 | Jones | 83—522 |
| 2,249,121 | 7/1941 | Drescher | 90—11 |
| 3,103,844 | 9/1963 | Persson | 83—520 |

GERALD A. DOST, Primary Examiner

U.S. Cl. X.R.

33—125, 185; 83—522; 350—116, 243